United States Patent
Chin et al.

(10) Patent No.: US 8,606,270 B2
(45) Date of Patent: Dec. 10, 2013

(54) METHOD AND APPARATUS FOR USER EQUIPMENT INTERACTION WITH A NETWORK USING INTERACTION INFORMATION

(75) Inventors: Chen Ho Chin, Middlesex (GB); Craig Bishop, Middlesex (GB)

(73) Assignee: Samsung Electronics Co., Ltd (KR)

( * ) Notice: Subject to any disclaimer, the term of this patent is extended or adjusted under 35 U.S.C. 154(b) by 689 days.

(21) Appl. No.: 12/117,299

(22) Filed: May 8, 2008

(65) Prior Publication Data

US 2008/0280620 A1 Nov. 13, 2008

(30) Foreign Application Priority Data

Oct. 5, 2007 (GB) .................................. 0719523.3

(51) Int. Cl.
*H04W 4/00* (2009.01)

(52) U.S. Cl.
USPC .......................... 455/435.1; 455/446; 370/328

(58) Field of Classification Search
USPC ........ 455/435.1, 436, 446; 370/331, 338, 329
See application file for complete search history.

(56) References Cited

U.S. PATENT DOCUMENTS

| | | | | |
|---|---|---|---|---|
| 5,289,527 A | * | 2/1994 | Tiedemann, Jr. ........... | 455/435.1 |
| 5,588,043 A | * | 12/1996 | Tiedemann et al. ........ | 455/435.1 |
| 5,732,350 A | * | 3/1998 | Marko et al. ............... | 455/435.1 |
| 5,898,923 A | | 4/1999 | Gaasvik et al. | |
| 6,131,030 A | | 10/2000 | Schon et al. | |
| 6,223,143 B1 | * | 4/2001 | Weinstock et al. ............. | 703/17 |
| 6,505,046 B1 | * | 1/2003 | Baker ......................... | 455/456.3 |
| 2002/0006794 A1 | * | 1/2002 | Vialen et al. .................. | 455/426 |
| 2002/0019698 A1 | * | 2/2002 | Vilppula et al. .............. | 701/207 |
| 2003/0040313 A1 | * | 2/2003 | Hogan et al. .................. | 455/435 |
| 2003/0119533 A1 | * | 6/2003 | Sarkkinen et al. ............ | 455/500 |
| 2005/0054349 A1 | * | 3/2005 | Balachandran et al. ... | 455/456.1 |
| 2005/0213541 A1 | * | 9/2005 | Jung et al. ..................... | 370/331 |
| 2005/0288017 A1 | * | 12/2005 | Doumenc et al. .......... | 455/435.3 |
| 2006/0198312 A1 | * | 9/2006 | Schondelmayer et al. ... | 370/241 |
| 2007/0104167 A1 | * | 5/2007 | Nakamata et al. ............ | 370/338 |

(Continued)

FOREIGN PATENT DOCUMENTS

| | | |
|---|---|---|
| EP | 1 286 561 | 2/2003 |
| EP | 1 718 092 | 11/2006 |

(Continued)

OTHER PUBLICATIONS

Samsung: "Registration on Home & Private eNBs", C1-071275, May 7, 2007.

(Continued)

*Primary Examiner* — Jinsong Hu
*Assistant Examiner* — Nathan Taylor
(74) *Attorney, Agent, or Firm* — The Farrell Law Firm, P.C.

(57) ABSTRACT

A method of operating a communications network and mobile user equipment (UE) in the network includes providing the UE with an algorithm usable with at least one input parameter to derive a quantity of interaction information according to the at least one input parameter, transmitting at least one said input parameter from the network to the UE, using the algorithm with the received at least one input parameter to derive a quantity of interaction information according to the received at least one parameter, and using the derived quantity of interaction information to determine at least one aspect of interaction between the UE and the network.

29 Claims, 11 Drawing Sheets

(56) References Cited

U.S. PATENT DOCUMENTS

| | | | |
|---|---|---|---|
| 2007/0149208 A1* | 6/2007 | Syrbe et al. | 455/456.1 |
| 2007/0153735 A1* | 7/2007 | Frederiksen et al. | 370/329 |
| 2007/0153742 A1* | 7/2007 | Sebire et al. | 370/331 |
| 2007/0213060 A1* | 9/2007 | Shaheen | 455/436 |
| 2007/0275707 A1* | 11/2007 | Kwak et al. | 455/414.2 |
| 2008/0167054 A1* | 7/2008 | Shaheen | 455/458 |
| 2008/0280620 A1* | 11/2008 | Chin et al. | 455/446 |
| 2009/0122727 A1* | 5/2009 | Gan et al. | 370/259 |
| 2010/0080171 A1* | 4/2010 | Rune et al. | 370/328 |
| 2010/0232391 A1* | 9/2010 | Olsson et al. | 370/331 |

FOREIGN PATENT DOCUMENTS

| | | |
|---|---|---|
| EP | 1 819 188 | 8/2007 |
| GB | 2 308 043 | 6/1997 |
| JP | 2001-197537 | 7/2001 |
| JP | 2002-524893 | 8/2002 |
| KR | 1020030020315 | 3/2003 |
| KR | 1020060049637 | 5/2006 |
| RU | 2 107 397 | 3/1998 |
| RU | 2 175 816 | 11/2001 |
| WO | WO 2004/059996 | 7/2004 |
| WO | WO 2004/066658 | 8/2004 |
| WO | WO 2007/078164 | 7/2007 |

OTHER PUBLICATIONS

Vodafone: "Mobility Management Identifiers in EPS Entities", C1-071669, Aug. 20, 2007.
Samsung: "Use of Tracking Area- and Cell Identity for Private Networks/Home Cells", R2-071349, Mar. 26, 2007.
Vodafone: "The Home Cell Concept in Enhanced Packet System", C1-071668, Aug. 20, 2007.
$3^{rd}$ Generation Partnership Project; Technical Specification Group Core Network and Terminals; 3GPP System Architecture Evolution; CT WG1 Aspects (Release 8), 3GPP TR 24.801, Sep. 2007.
Catt, "P-CR TR24.801: S-TMSI and TA List Reallocation Procedure", 3 GPP TSG CT WG1 Meeting #48, Vienna, Austria, Aug. 20-24, 2007.
Vodafone, Telecom Italia, "Limitations of 3G/UMTS for Home Cell Deployments", 3GPP TSG CT WG1 Meeting #48, Vienna, Austria, Aug. 20-24, 2007.
3rd Generation Partnership Project; Technical Specification Group Services and System Aspects; GPRS Enhancements for E-UTRAN Access (Release 8), 3GPP TS 23.401, Oct. 2007.
3rd Generation Partnership Project; Technical Specification Group Services and System Aspects; GPRS Enhancements for E-UTRAN Access (Release 8) 3 GPP TS 23.401 V1.2.1, Sep. 2007.
Mitsubishi Electric, "Self-Optimization of Assigned TA List from Reported List of Last Visited TAs", S2-073219, 3GPP TSG SA WG2 Meeting #59, Aug. 31, 2007.
Panasonic, "CSG Cell Prioritization by UE", R2-073282, 3GPP TSG RAN WG2 #59, Aug. 20, 2007.

* cited by examiner

METHOD AND APPARATUS FOR USER EQUIPMENT INTERACTION WITH A NETWORK USING INTERACTION INFORMATION

PRIORITY

This application claims priority under 35 U.S.C. §119(a) to an application filed in the United Kingdom Intellectual Property Office on Oct. 5, 2007 and assigned Serial No. 0719523.3, the contents of which are incorporated herein by reference.

BACKGROUND OF THE INVENTION

1. Field of the Invention

The present invention relates generally to a method and apparatus in mobile communications, and in particular to a communications network and the interaction of mobile user equipment (UE) with the network in accordance with interaction information.

2. Description of the Related Art

The relevant Third Generation Partnership Project (3GPP) Technical Specification Group (TSG) Working Groups (WGs) of System Archtecture Working Group 2 (SA2), Radio Access Network 2 (RAN2) and CT1 have agreed that the UE will be provided with a list of Tracking Areas (TAs) when that UE registers (or updates its registration) to the Enhanced Packet System (EPS). This list of TAs termed Multi-TAs (multiple TAs) will indicate to the UE that so long as the UE moves within the TAs given in the Multi-TA list, the UE need only perform a periodic TA update procedure to remain registered to the EPS. This concept is described in 3GPP TS 23.401.

A consensus is being reached in regards to RAN2 and CT1 that the realization of the Home E-Universal Terrestrial Radio Access Network (E-UTRAN) Node B (home eNB) feature and the campus NB feature should be done through the use of a "White list" of "allowed" TAs on which the UE could be listed. The background to the home eNB and campus NB concepts and their intended deployment scenarios are discussed in 3GPP documents C1-071667, C1-071668, with C1-071669 providing discussion on the workings of the White-TA list.

From TS 23.401 and TR 24.801 it is clear that managing the mobility of the UE will be facilitated by introducing to the UE a list of TAs that is understood by the UE to be the list of TAs in which the UE is registered and can obtain service in. So long as the UE moves within the TAs identified in this list of TAs, the UE need not update the Enhanced Packet Core (EPC) of its new location, other than having to perform periodic updates. This list of TA will be updated when the UE moves out to another TA that is not indicated on the list of TAs. This list of TAs allows for extended mobility in all the TAs of that list is termed the Multi-TA list.

Additionally, the 3GPP TSG WGs of RAN2 and CT1 are concluding that to solve the requirements of the home eNB and campus NB scenarios, the UE shall be given the identities of the TAs the UE can access if the UE wants services on these home eNBs (ie. Base Stations of the Long Term Evolution (LTE) system) and/or campus/business establishments NBs. Specifically, a list of TAs will be identified as TAs on which the UE may camp and receive service related to these home eNBs and/or campus/business establishments NBs. Since this list is not a list of TAs on which the UE is forbidden to camp, but rather, is a positive indication of TAs on which the UE may camp, this list of TAs is termed the White-TA list.

Accordingly, since the goal is to provide the UE with a Multi-TA list and also a White-TA list, work must take place to determine, for example, how these TA lists should be structured, how many TAs should be in each of these TA lists, and what signalling protocol messages will transport these TA lists.

To better understand the extent of the problems in the prior art, and in particular the problem of how many TAs are to be in the TA lists, the White-TA list will now be analyzed. As discussed in C1-071668, it is envisaged that home eNB deployment will be in the millions and campus deployment will be in hundreds of thousands.

While it is unlikely that any individual home owner will possess and run more than half a dozen home eNBs, it is likely that hotel premises or commercial businesses will have campus deployments with perhaps hundreds of eNBs. It may be unrealistic to provide to the UE a list with hundreds of entries of TA identities, because the list will be too extensive, resulting in transmission delay, inefficiencies and difficulty in management and maintainenance of both the UE and the EPC.

The same problem applies to the Multi-TA list. When the UE is in a TA that is identified in the Multi-TA list, it does not need to perform a Tracking Area Update (TAU) procedure. Accordingly, the larger the Multi-TA list the bigger the physical area in which the UE can move without performing TAU (except a periodic TAU if in IDLE). Considering that LTE cells will not be very large, it is believed that the size of a TA will not likely be the size of a Location Area (LA) but more like size of a Routing Area (RA) even if a TA identity can be shared by more than one LTE cell.

This belief is also based on the need for a Multi-TA to solve the problem of excessive TAU from UEs as can occur with frequent Routing Area Update (RAU) in General Packet Radio Service (GPRS) and Universal Mobile Telecommunications System (UMTS). If a given TA identity is common only between a small number of LTE cells, and there is a very large number of total LTE cells, in order to use Multi-TA efficiently the Multi-TA list should contain not just a few TAs, but instead should have upwards of dozens of TAs. The signalling message that carries this Multi-TA list has the potential to get very large.

It is believed in the specification work groups that each eNB will have a unique TA.

Exacerbating the problems, there will be more than one TA list—namely a Multi-TA list and a White-TA list—that have to be conveyed from the EPC to the UE. Additional lists may be conveyed to the UE as well. For example, suggestions have been made to provide a forbidden-TA list. Moreover, there is the already existing list of equivalent Public Land Mobile Networks (ePLMNs) that also has to be provided in those same Non-Access Stratum (NAS) signalling messages.

To further compound the problem, if the number of TAs for Multi-TA and or White-TA lists is fixed, then there could be no use cases of radio planning and new deployment scenarios where much more or fewer LTE cells or TAs need be provisioned to different parts of the network. That is to say, a fixed number of TAs might not fit all network operational situations.

Presently, there are no known solutions to these problems in the prior art. For example, in 3GPP TR 24.801, version 0.3.0 it is acknowledged that the maximum number of tracking areas which can be allocated per UE needs to be defined.

With regard to the number of ePLMNs that a Core Network (CN) conveys to a UE, and the prior art transport mechanisms, current 3GPP TR 24.008 provides a list of ePLMNs through LOCATION_UPDATING_ACCEPT, ATTACH_ACCEPT and ROUTING_AREA_UPDATE_ACCEPT. The number of ePLMNs that can be provided in the list of ePLMN is a maximum of 15 entries, although fewer can be provided. In 3GPP TR 23.401 and expanded in C1-071879, it is discussed that the TA list can be provided in the System Architecture Evolution (SAE) equivalent of the Temporary Mobile Subscriber Identity (TMSI) reallocation procedure (ie. the S-TMSI Reallocation procedure) adapting the TMSI REALLOCATION COMMAND message. However, neither 3GPP TR 24.401 nor C1-071879 provides any insight on the coding of the intended TA list or the size of that TA list.

SUMMARY OF THE INVENTION

Accordingly, the present invention has been made to solve at least one of the problems associated with the prior art.

According to a first aspect of the present invention, there is provided a method of operating a communications network and UE in said network, the UE interacting with the network in accordance with interaction information, including providing the UE with a predetermined algorithm usable with at least one input parameter to derive a quantity of interaction information according to the at least one input parameter, transmitting at least one said input parameter from the network to the UE, using in the UE, the algorithm with the received at least one input parameter to derive a quantity of interaction information according to the received at least one parameter, and using the derived quantity of interaction information to determine at least one aspect of interaction between the UE and the network.

The term "interaction information" is used herein to indicate any information or data that affects or determines how the UE interacts with the network. This interaction information is distinct from information or data forming the content (or payload) of messages between the UE and some other UE or alternative destination that is relayed by the network. The interaction information is concerned with the operation of the UE with the network, and not the content of calls and data transfers.

Examples of interaction information (or data) include information concerning the structure of the network, the location and/or address of network elements, protocols to be used for certain transactions, available channels or channels to be used, access to the system, such as whether access is allowed or denied for particular circumstances for a particular location, an area or portion of the network in which the UE is registered to operate, certain eNBs through which the UE is allowed to access the network, areas in which access is denied, a list of TAs for which the UE is registered and/or in which the UE can move without being required to re-register or send an update message to the system, a multi-TA list, a White list of TAs and/or Closed Subscriber Groups (CSGs) in which the UE is permitted to access the network, an answer to a question, such as "is the current TA of the UE inside or outside the current registration area?", and the relative location of the UE within a current registration area.

The derived quantity of interaction information is used in a variety of ways. For example, it is used to determine whether the UE sends a message to the network to update its registration or to provide an update of its position. Thus, the derived information may be used to trigger the sending of a message.

An advantage provided by embodiments of the present invention is that by deriving the interaction information in the UE using the algorithm and received parameters, the amount of data that needs to be transmitted from the network to the UE is reduced. Rather than having to transmit the interaction information, which could be a long list identifying TAs defining a registration area, the network need only transmit the parameters from which the UE can derive the information.

Also, in certain embodiments the UE is not required to store long lists of TAs. Instead, when necessary it can simply use its pre-programmed algorithm with the received parameters to determine whether a particular TA (e.g. a current TA) is outside a registration area, and hence decide whether to send a TAU request to the network. Memory requirements are thereby reduced.

The input parameters enable the algorithm to calculate the quantity of interaction information. In certain embodiments, these input parameters include parameters indicative of at least one of a shape, size, and position of an "area" of the network, which may be defined in terms of TAs, CSGs or IP addresses corresponding to eNBs. From such parameters, the algorithm determines whether a particular location is within the defined "area" and interacts with the network accordingly. The algorithm generates a list of TAs/CSGs/IP addresses from the received parameters in order to make this determination, but in certain embodiments this is not necessary, because the algorithm makes the determination without explicitly generating the list.

In the present invention, the transmitted input parameters include an input parameter indicative of at least one of a size, shape, or location of an area or portion of the network. This may, for example, be a portion of the network for which the UE is registered (and the registration may also form part of the method), and may be defined in a number of ways. For example, it may be defined in terms of a number of TAs or other cell forms.

In the present invention, the derived quantity of interaction information includes an indication of whether a particular location, area or region is within said area or portion of the network. For example, this "particular location, area or region" may be the location, area, or region in which the UE is currently located.

In the present invention, the derived quantity of interaction information also includes a list of TA identity codes of TAs defining the area or portion of the network. The derived quantity of interaction information may then also include an indication of whether a particular TA (e.g. the TA in which the UE is currently located) is within the defined area or portion, although in certain embodiments this determination could be performed in the step of using the derived quantity of interaction information to determine at least one aspect of interaction between the UE and the network.

In other words, after generating the list from the parameters, using the pre-programmed algorithm, the UE determines whether its current TA was inside the defined area, and if not, sends a message to the network requesting re-registration and/or updates the network as to the UE's location. This sending (or not) of the re-registration/update message is thus one example of an aspect of interaction between the UE and the network determined by the derived quantity of interaction information.

Thus, the step of using the derived quantity of interaction information in the present invention includes sending a message from the UE to the network if the UE is not within said area or portion of the network. The area or portion of the network may be an area or portion for which the UE is registered, and the step of sending a message from the UE may then include sending a message to re-register the UE with the network.

In the present invention, the transmitted input parameters include an input parameter indicative of a range of TA codes. Then, the derived quantity of interaction information may include a list of the TA codes in that range. Additionally, the derived quantity of interaction information includes an indication of whether a particular TA code is within the range. In the present invention, the particular TA code is a code of a TA in which the UE is currently located.

According to the present invention, the transmitted input parameters include an input parameter indicative of a range of Internet Protocol (IP) addresses, each IP address corresponding to a respective eNB of the network. Then, the derived quantity of interaction information includes a list of the IP addresses in said range. Additionally, the derived quantity of interaction information includes an indication of whether a particular IP address is within said range. The particular IP address is an IP address of an eNB with which the UE is currently interacting.

According to the present invention, provided is a method of operating a cellular communications network and UE in said network including a plurality of TAs, the method including registering the UE with the network for operation within a registration area defined by a plurality of TAs, providing the UE with an algorithm usable to determine whether a current TA is within the registration area, transmitting from the network to the UE at least one parameter for the algorithm, determining a current TA of the UE (i.e. the TA in which the UE is currently located or through which the UE can currently communicate with the network), using in the UE, the algorithm and the parameter to determine whether the current TA is within said registration area, and communicating with the network to update the registration if the current TA is outside the registration area.

Further embodiments provide a communications network adapted for use in any one of the methods described above. Thus, the communications network in certain embodiments is adapted to transmit at least one input parameter to a UE, the input parameter being a parameter from which the UE can derive interaction information by using an algorithm. In certain embodiments the communications network may also be adapted to provide the algorithm to the UE. Alternatively, the UE may be provided with the algorithm by other means such as preprogramming.

According to the present invention, a UE may be programmed with an algorithm, and adapted to use that algorithm with at least one received parameter from a network to derive interaction information, and then interact with the network according to the derived information.

According to a second aspect of the present invention, there is provided a method of operating a cellular communications network and UE in said network including a plurality of TAs, the method including registering the UE with the network for operation within a registration area defined by a plurality of TAs, and transmitting from the network to the UE a first list identifying a plurality of said TAs defining the registration area, wherein transmitting said first list includes transmitting an S1 interface message having said first list to an eNB, and transmitting from the eNB to the UE a plurality of data packets having said first list.

In the present invention, the list identifies (for example, by means of the codes of the TAs) all of the TAs that form the registration area. However, in alternative embodiments, the list may not identify all of the TAs forming the registration area. In such embodiments, the list may have been limited in some fashion, such as by a size adjustment, so that it could fit (i.e. be transmitted) in a single Signalling Interface S1 interface message having a maximum length.

In the present invention, the S1 interface message is an S1 (Signalling Interface of the control plane between eNB and EPC)-AP signal or an S1 Direct transfer message.

In certain embodiments the method further includes adjusting a size of the first list to fit inside the single S1 interface message. The transmitted S1 interface message may, in certain embodiments, have additional data. Specifically, the size of the list may be adjusted (e.g. the list may be trimmed) to fit inside the single S1 interface message with the additional data. In other words, the size of the transmitted list of TAs may be adjusted to fit inside the portion of the S1 message left over after having the additional data. The list size may be adjusted according to the capacity of the single message, considering any additional data required or desired to be present.

Thus, unlike prior art techniques, the size of the TA list supplied to the UE is not fixed, but may be adjusted dynamically according to the present invention.

The method according to the present invention further includes transmitting from the network to the UE a second list identifying a further plurality of TAs and/or a plurality of closed subscriber groups in which the UE is allowed to access the network, wherein transmitting the second list includes transmitting the second list in the same S1 interface message as the first list, and the plurality of data packets have the second list and the first list.

The method further includes adjusting a size of at least one of the first and second lists such that both the first and second lists fit inside the single S1 interface message.

As described above, the S1 interface message has additional data, and the step of adjusting includes adjusting a size of at least one of the first and second lists such that both the first and second lists fit inside the single S1 interface message together with the additional data. This adjustment in certain embodiments includes adjusting the relative sizes of the first and second lists.

Thus, according to the invention, the network is not limited to transmitting fixed sized lists (Multi-TA lists, or so-called white lists of TAs and/or CSGs) to the UE. Instead, the network has control over the list sizes, and can adjust them according to any predetermined or evolved criteria as necessary, while fitting both lists inside a single S1 message. This can be a message having the sole purpose of conveying the lists to the UE, or alternatively the lists can be inserted in a message having another purpose (in effect, using the spare capacity of that message).

In the present invention, the S1 interface message has a maximum length, and the method includes truncating the S1 interface message if the first list, together with any second list and any additional data occupies less than the maximum length. The step of truncating may, for example, include terminating the S1 interface message with an end indicator.

By truncating the message, embodiments of the invention provide the advantage that the number of packets or blocks sent from the eNB to the UE can be reduced. Accordingly, blocks are not needlessly sent including "dummy" or "filler" TA identities.

It will be appreciated that the list or lists may be distributed in the data packets in a variety of manners according to the invention. Thus, in general, a particular packet or block has part of a list entry, a whole list entry, or any combination of part and whole entries.

It will also be appreciated that the network is not limited to sending a first list or a first and a second list, in the S1 message. The S1 message may have an additional list or lists in certain embodiments.

The present invention further includes receiving at the UE the data packets having the list or lists, and processing in the UE the received list or lists. This processing in the UE may include determining whether a particular TA is identified in one of said lists. It further includes determining whether a TA in which the UE is currently located is identified in the first list, and if the current TA is not identified in the first list, sending a message from the UE to the network. This message may, for example, be a TAU request.

According to the present invention, provided is a cellular communications network adapted to transmit to a LYE a first list identifying a plurality of TAs, by transmitting from a Mobility Management Entity (MME) an S1 interface message having the first list to an eNB, and transmitting from the eNB to the UE a plurality of data packets containing first list.

According to the present invention, provided is a UE adapted to receive one or more lists of TAs included in a plurality of data packets or blocks transmitted from an eNB, and to process the received list or lists. The UE may be adapted to determine whether a current TA is identified in a received list, and respond accordingly, such as by sending an update request message to the network.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Figure 1:
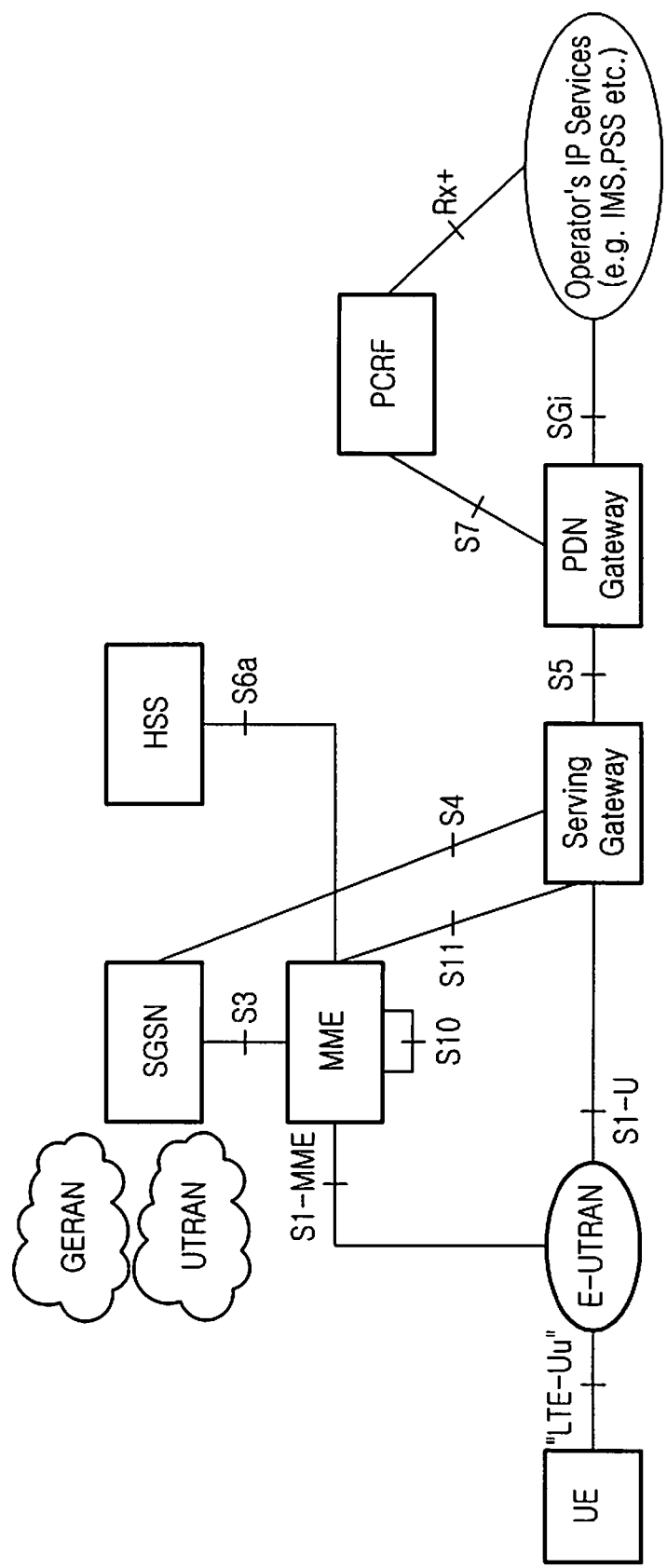
FIG. 1 illustrates the architecture of a communication system including communications networks and UEs to which the present invention is applied.

Hereinafter, preferred embodiments of the present invention will be described in detail with reference to the accompanying drawings. The same reference numerals are used to denote the same structural elements throughout the drawings. In the following description of the present invention, the detailed description of known functions and configurations incorporated herein is omitted for the sake of clarity and conciseness.

FIG. 1 illustrates the SAE/LTE reference architecture as defined by 3GPP, to which the present invention is employed.

Shown in FIG. 1 is also the 2G GSM/GPRS system (GERAN+SGSN) and the 3G UMTS system (UTRAN+SGSN). From FIG. 1, one is able to the see the "link-up" from/to the 3GPP 2G and 3G system and 3GPP's SAE/LTE.

Figure 2:
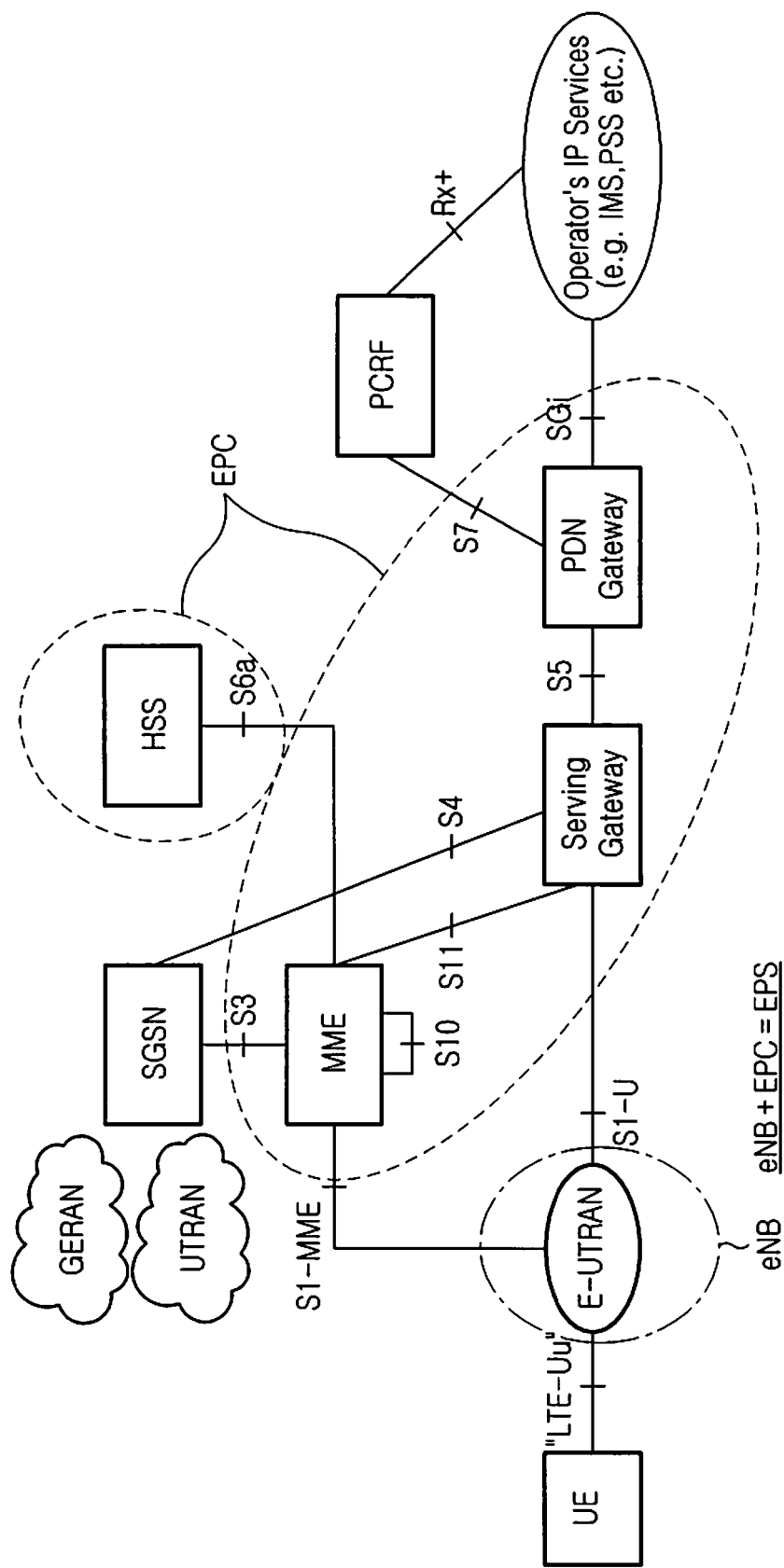
FIG. 2 illustrates the architecture of a communication system including communications networks and UEs to which the present invention is applied.

FIG. 2 illustrates the architecture of a communication system including communications networks and UEs to which the present invention is applied, and refers to EPC and EPS discussed herein. FIG. 2 assists in the visualization of the scope of the EPC. It is noted that EPC also encompasses the HSS in FIG. 2.

In a first of "implanting a seed" methods herein, the idea is that the UE is not given a list of TAs or lists of TA directly. In this method, the UE is given an algorithm, which may for example be in the form of a customised piece of software. Then with further provision of input parameters to that algorithm or piece of software (or seed, as it may also be described), the UE can self generate the list of TAs or lists of TAs.

Figure 3:
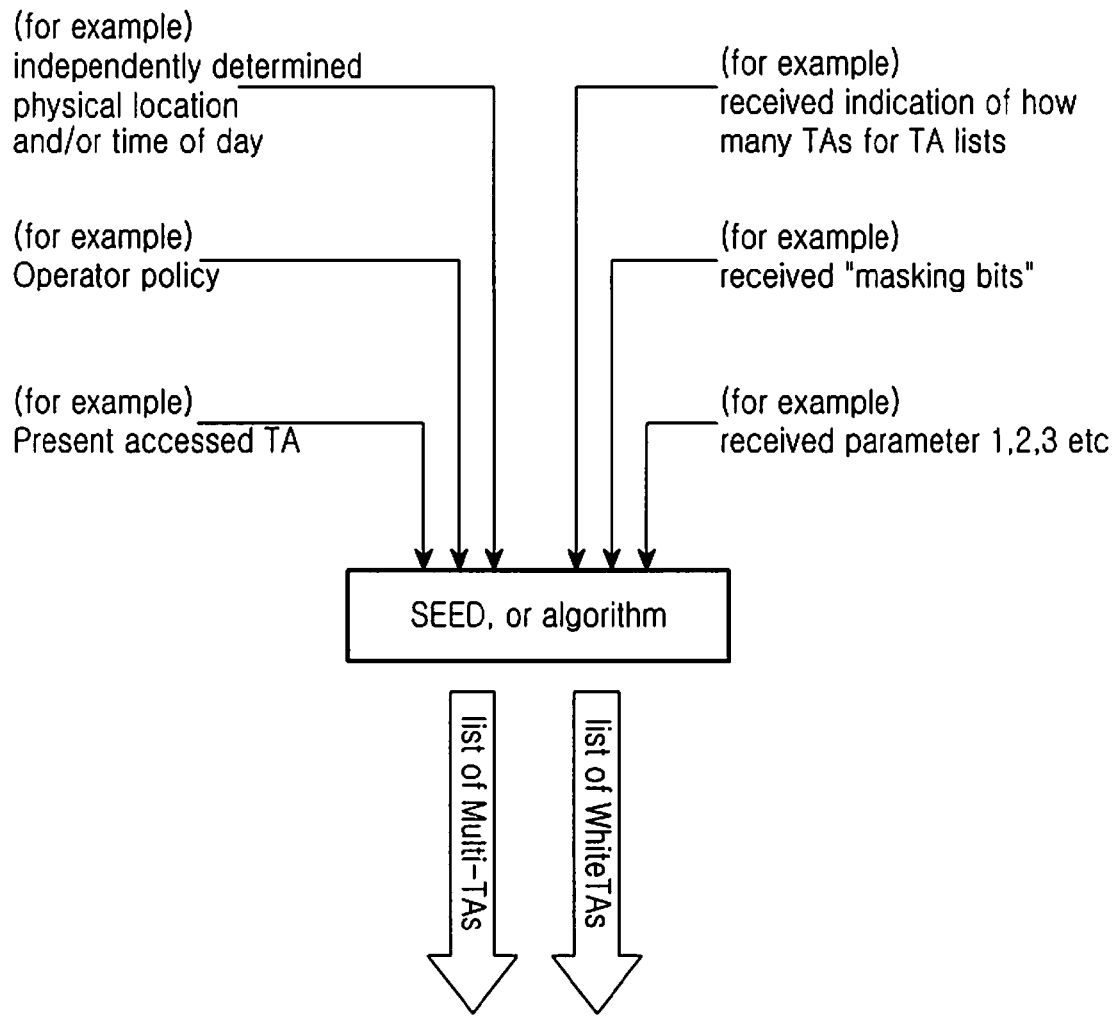
FIG. 3 illustrates the derivation of interaction information in the form of TA lists, using an algorithm in the UE and received input parameters according to the present invention.

FIG. 3 illustrates the implanting a seed method, and particularly illustrates the derivation of interaction information in the form of TA lists, using an algorithm in the UE and received input parameters according to the present invention. A piece of information, be it an algorithm or an executable code, is given to the UE and the UE is not given an explicit list (or lists) of TAs.

Figure 4:
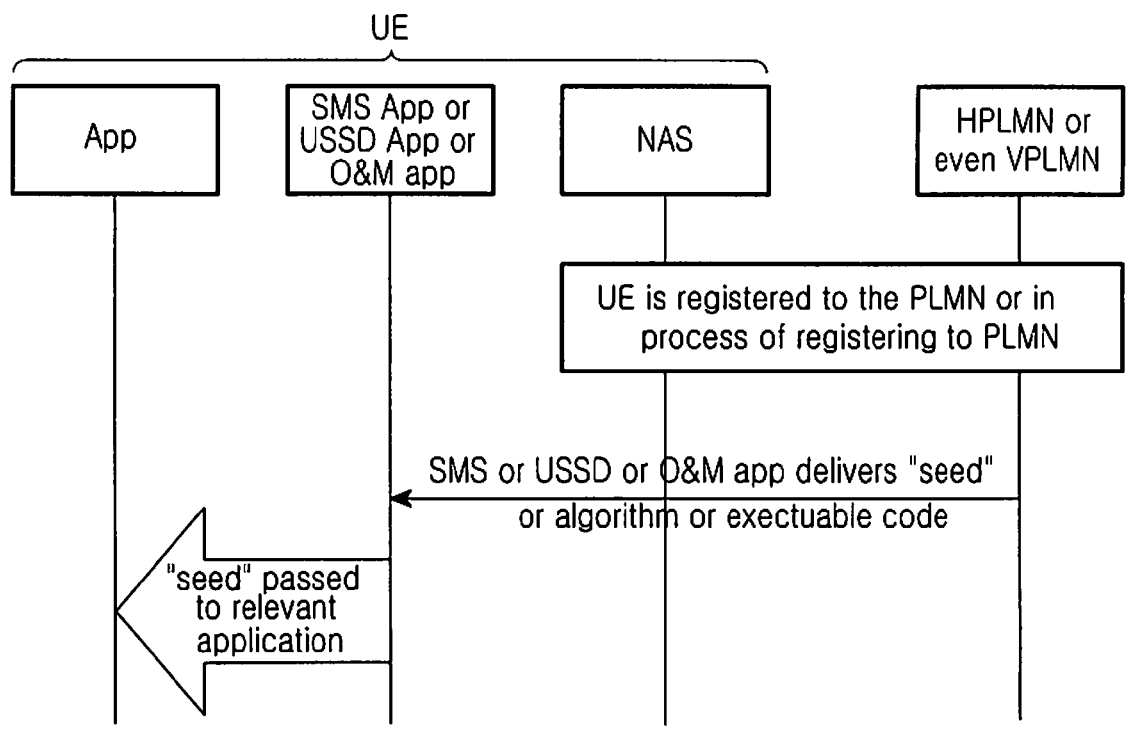
FIG. 4 illustrates techniques for providing UE with an algorithm according to the present invention.

The delivery of the "seed" to the UE may be through an "offline" technique. By offline, it is meant that the Non-Access Stratum (NAS) is not involved in the actual delivery. NAS is quoted here because the TA lists are meant for NAS and used by NAS. In the prior art, the NAS of the EPC will be sending to the NAS in the UE the lists of TA. Herein, by offline it is meant that the delivery of the "seed" or algorithm or executable code is performed at the time of initial provisioning of the UE by the operator at the application level or by applications or by Short Message Service (SMS) or by Unstructured Supplementary Service Data (USSD), as illustrated in FIG. 4.

The offline delivery could also encompass the UE interrogating a server to download the seed, e.g. the address of a server is delivered during registration signalling or in off-line signalling from which for a seed specific to the campus through which the UE had registered could be retrieved.

Figure 5:
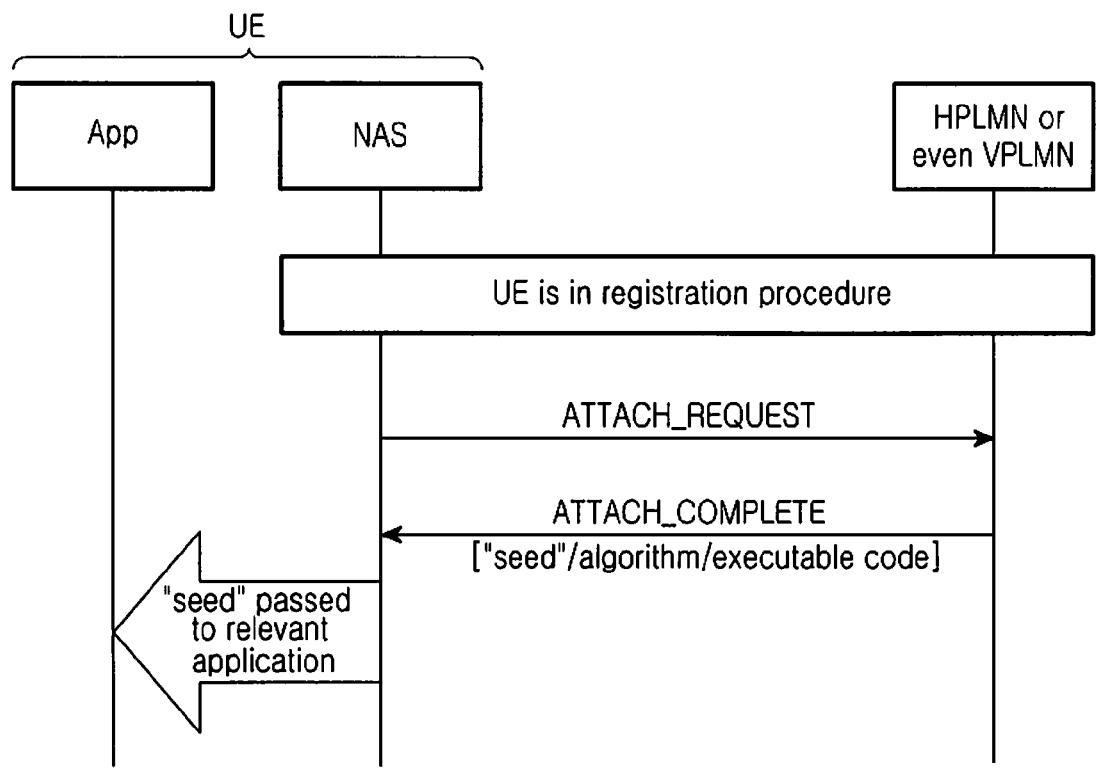
FIG. 5 illustrates techniques for providing UE with an algorithm according to the present invention.

In alternative embodiments, the delivery of the seed may be through protocol signalling. In such techniques, the seed (or algorithm or executable code) can also be delivered as part of the NAS procedures that are performed between the UE and the EPC during registration or registration update, as illustrated in FIG. 5.

As illustrated in FIG. 3 there can be any number of input parameters to this seed. These inputs can be provided to the UE in the same manner as the seed itself, ie. by techniques as illustrated in FIGS. 4 and 5.

Figure 10:
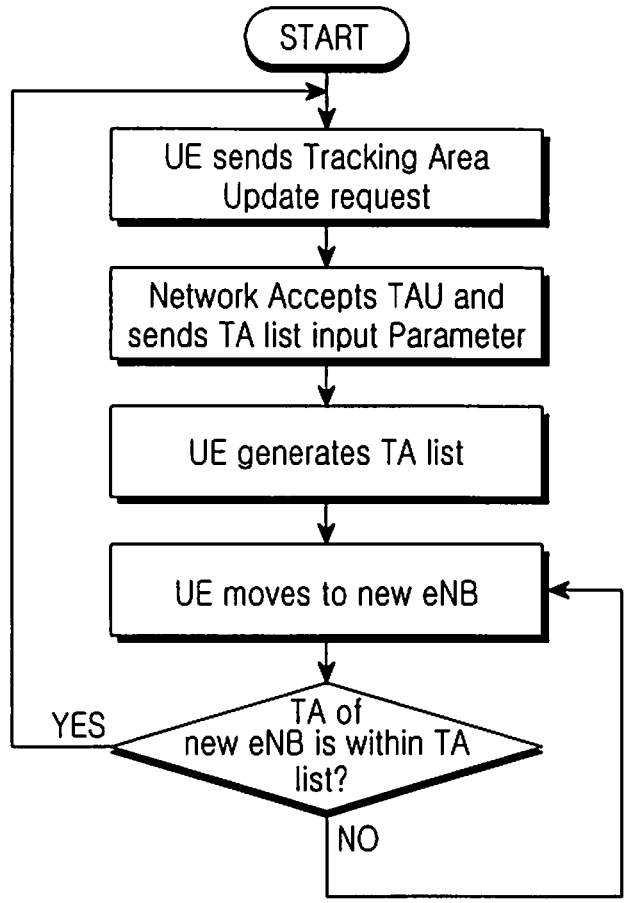
FIG. 10 is a flowchart illustrating part of a first method according to the present invention, and which is performed in certain UEs according to the present invention.

FIG. 10 illustrates an example of a logical flow where the input parameter is used by the seed in the UE to generate a list of TA identity codes against which the TA identity code of a moved to eNB can be checked to determine whether the UE needs to update its TA location to the network.

Figure 11:
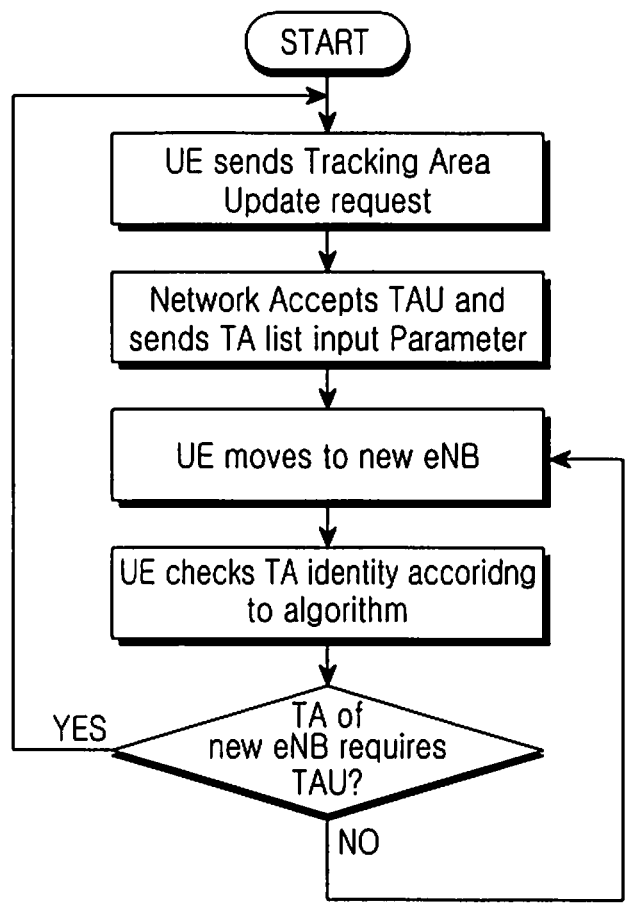
FIG. 11 is a flowchart illustrating part of a second method according to the present invention, and which is performed in certain UEs according to the present invention.

FIG. 11 illustrates an example of a logical flow where the input parameter is used in conjunction with the TA identity codes broadcast by the eNB by the seed in the UE to determine whether the UE needs to update its TA location to the network.

Figure 6:
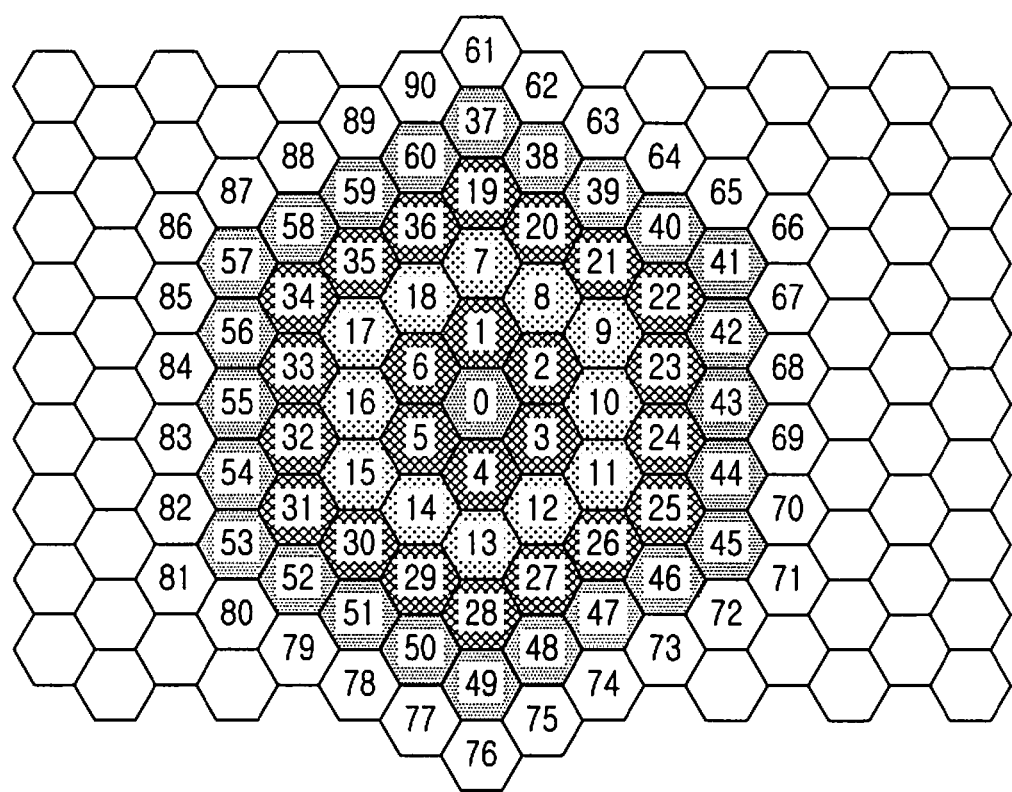
FIG. 6 illustrates the arrangement of TAs in a cellular UE communications network in which a method according to the present invention is employed.

A communications network in which a method according to the present invention is applied is illustrated in FIG. 6. FIG. 6 illustrates a simple TA layout (hexagonal array) for a UE system, the sort that may be used for basic network planning. The TAs are numbered 0 . . . n moving clockwise in a concentric layers away from the central TA.

Using a TA layout such as this, it is possible to describe a dynamic group of TAs without having to explicitly signal the identity of each, but by using a seed formula and specifying the number of layers or size of the TA group.

For example, each layer has 6 corner TAs (cTAs) moving out from the central TA (e.g. {1,2,3,4,5,6}, {7,9,11,13,15,17} {19,22,25,28,31,34} . . . If the cTAs, $cTA_0$ . . . $cTA_5$ are thus numbered, the corner sequence for each layer can be described in Equation 1 as follows:

$$cTA_i(n)=3n^2+(i-3)n+1 \qquad \text{Equation (1)}$$

where "n" is the number of the layer in question and "i" is the $i^{th}$ corner position in the layer.

In this case, the above sequence descriptor constitutes the seed in that it identifies all the neighbors from the central TA "0" and the cTAs of each concentric layer moving out from the central TA. The other TAs in the layer can be described as their position relative to a cTA, in Equation (2) as follows:

$$TAX=cTA_i(n)-y \qquad \text{Equation (2)}$$

where X is the TA number and y is the offset from the nearest higher valued cTA.

If the first TA ($CTA_0$) is labeled in each layer the start TA or $sTA$, it also is possible to identify the layer in which the current TA resides by checking the values between which sTA lies. The TA values in the layers either sides of the one in which a TA resides are determined in Equations (3) and (4) as:

$$\text{Inner Layer } cTAs=cTA_i(n-1)=3(n-1)^2+(i-3)(n-1)+1 \qquad \text{Equation (3)}$$

and $$\text{Outer Layer } cTAs=cTA_i(n+1)=3(n+1)^2+(i-3)(n+1)+1; \qquad \text{Equation (4)}$$

Once the cTAs and the TA values in the inner and outer layers are known, it is possible to calculate the neighbouring TAs for each TA.

For cTAs the process is fairly straight forward. The neighbour TAs residing in the same layer will be expressed as:

$cTA_i(n)-1$; and $cTA_i(n)+1$.

For a cTA there will only be one neighbor TA residing in the Inner Layer and that can be expressed as:

$cTA_i(n-1)$;

Of the three neighbors in the Outer Layer one will also be expressed as a cTA:

$cTA_i(n+1)$;

and the others will lie on either side of this at:

$cTA_i(n+1)-1$; and $cTA_i(n+1)+1$.

So when considering TA 45 which is $cTA_2(R)_4$, its neighbors are expressed as:

$cTA_2(4)-1$; $cTA_2(4)+1$; $cTA_2(3)$; $cTA_2(5)$; $cTA_2(5)-1$; & $cTA_2(5)+1$;

This expression can be calculated to be: 44,46,25,71,70&72

For non-cTAs the process is slightly more complex. For example, with respect to TA 32, since the seed is known we can determine that TA 32 lies between sTAs 19 & 36, thus residing in the $3^{rd}$ layer. It is implicitly known that two of its neighbors residing in the same layer are TAs 31 & 33. Using the seed it can be calculated that TA 31 is $cTA_4(3)$ and knowing the position of TA 32 relative to a cTA enables the calculation of the remaining neighbors of which two will reside in the Inner Layer and two in the Outer Layer.

So in Equation (4) if:

$$TA32=cTA_4(3)+1; \qquad \text{Equation (5)}$$

Its neighbors on the Inner Layer can be calculated in Equations (6) and (7) as:

$$cTA_4(2)+1=3(2)^2+(4-3)2+2=16; \qquad \text{Equation (6)}$$

and $$cTA_4(2)=3(2)2+(4-3)2+1`16=15; \qquad \text{Equation (7)}$$

Similarly, its neighbors on the Outer Layer can be calculated in Equations (8) and (9) as:

$$cTA_4(4)+1=3(4)^2+(4-3)4+2=54; \qquad \text{Equation (8)}$$

and $$cTA_4(4)+2=3(4)2+(4-3)4+2=55; \qquad \text{Equation (9)}$$

There is one problem for the central TA that does not obey the rule of the general seed as cTAx(0) will always equal, as shown in Equation (10):

$$3(0)2+(0-3)0+1=1; \qquad \text{Equation (10)}$$

Thus it is necessary also to include a specific condition such that cTA(0)=0.

Given the above conditions, it would be possible for the network to indicate the list of TAs to be used by a terminal simply by signalling the TA group size in number of TA layers. For example, if the terminal is currently camped in TA 3, and the network signals a TA group size of 3, the terminal could calculate the identities of all the TAs in that group by identifying the neighboring TAs of TA 3 and those of each of its neighbours and so on for 3 iterations.

Figure 7:
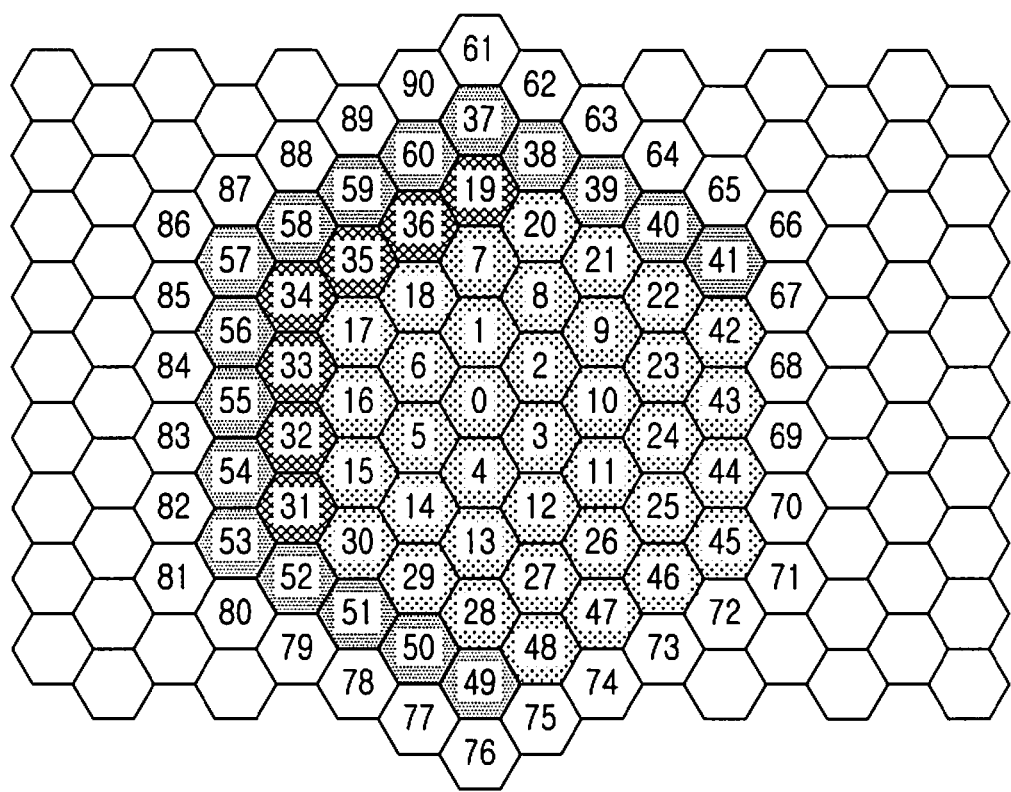
FIG. 7 illustrates a registration area in a network such as that whose TA arrangement is shown in FIG. 6.

FIG. 7 illustrates an example of a set of TAs corresponding to a registration area calculated from input parameters to the algorithm of current TA=3, and group size=3. This set corresponds to the three-layer hexagon centered on TA=3. Thus, the UE has, by use of the algorithm, been able to calculate the numbers of the other TAs in the registration area from just the two input parameters. There are 37 TAs in this set.

Naturally, providing just input parameters identifying a central TA and number of layers would only deliver hexagonal coverage areas for groups of TAs. However, additional information (in the form of one or more additional parameters) can be signalled to the UE in alternative embodiments to tailor the overall shape of the coverage are, such as by masking cells in one layer that fall within between certain TAs. Thus, parameters indicative of the shape of the coverage area are transmitted in certain embodiments. Such a modified coverage area is also shown in FIG. 7 (the original hexagonal area centred on TA 3 has been extended to include TAs 31-36, 19, 49-60, and 37-41).

The example above is fairly complex even though it concerns a regular TA layout. The field networks will not be planned in this manner, though this sort of layout could be used as an overlay encompassing TAs having different coverage areas due to eNB location and local topography. However, this is designed to show the general concept of having a seed and providing a minimum set of information to dynamically generate the TA list.

An alternative method according to the present invention and using the general seed concept (i.e. providing the UE with an algorithm and then transmitting one or more parameters which the algorithm uses to generate or derive interaction information) will now be described. This is also described as an example of IP subnet re-use in the case of campus deployment.

This alternative embodiment of the seed idea is one that could be effective particularly for campus deployment; in effect it uses an internet technique to enable the UE to identify which TAs it should consider as part of a "non-update" group, which is a group of TAs within which the UE need not perform a TAU/re-registration.

For this example, assuming that each eNB will have an IP address, then in campus deployments the addresses can be allocated in a similar manner to that in which they are allocated for IP subnets. It is then possible to use a subnet masking type solution in the terminal to identify TAs lying within the same group, or whether a particular current TA is within the same non-update, or allowed group.

For example, using IPv4 address format for simplicity, (though in reality it is most likely that IPv6 addresses will be used), a group of up to 1024 TAs within a campus is allocated a range of IP addresses between 136.168.0.0 and 136.168.3.255. Utilising a subnet mask of 255.255.252.0 and the first address in the range of TA addresses, a terminal UE is able (by bit ANDing) to quickly identify any TAs for which an update was not required (i.e. resides within the same campus).

For example,
255.255.252.0 bit ANDed with 136.168.2.24=136.168.0.0;
i.e. the TA is within the "permitted group".
255.255.252.0 bit ANDed with 136.168.4.0=136.168.4.0
i.e. the TA is outside of the permitted group.

Thus, the interaction information derived using the algorithm (which is supplied with an input parameter, in the form of the subnet mask, and a TA identity (in the form of the IP address of that TA)) is a single piece of information, namely whether that TA is within the permitted group. The UE then interacts with the network in accordance with this derived information; if the TA is outside the permitted group the UE performs an update, and if the TA is inside, the UE does not.

Thus, in this embodiment the network only has to provide the IP address of the current TA and the subnet mask (campus size) to the UE in order for the UE to identify allowed TAs.

This may be more difficult to implement outside of a campus, but it could be possible to deploy a wider network of TAs in such a manner.

Figure 8:
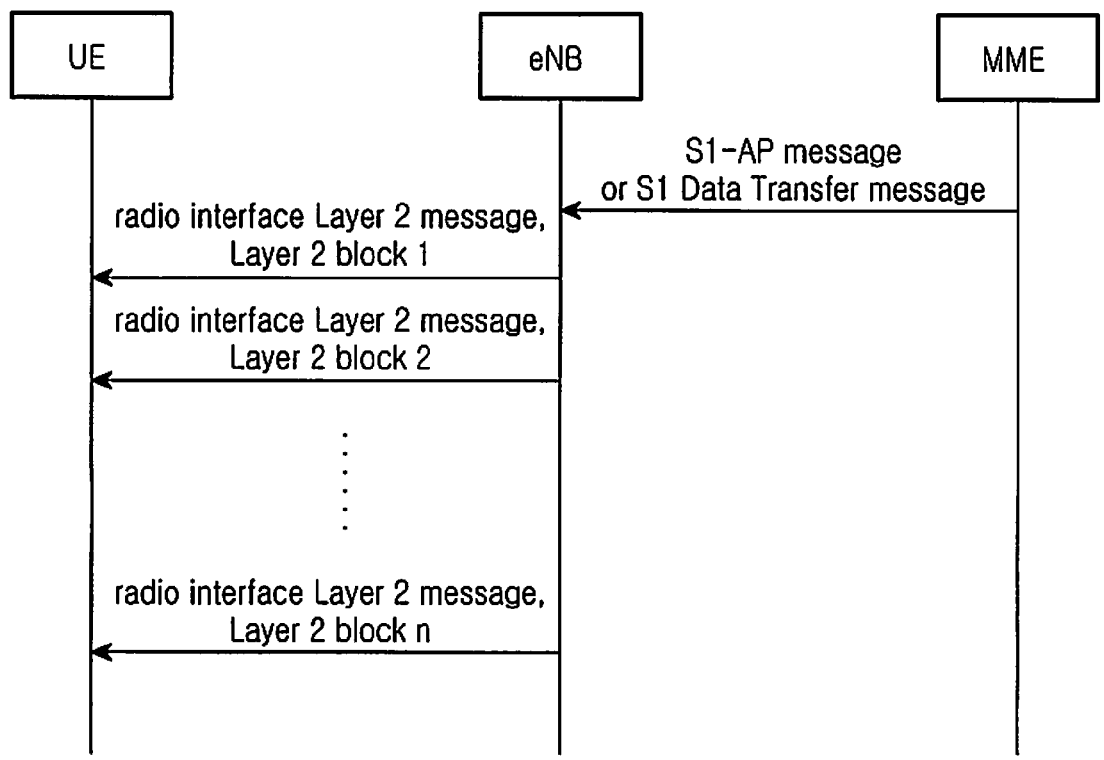
FIG. 8 illustrates the transmission of lists of TA codes or identities from a network to a UE in methods according to the present invention, the transmission using an S1 interface message from MME to eNB, and radio interface Layer 2 blocks from eNB to UE.

Another method according to the present invention will now be described. First, it is known that the MME will provide the lists of TAs. This is expected to be provided by the MME over the S1 interface, which then will be carried over the radio interface by radio Layer 2 data blocks. Given that each of the radio interface Layer 2 blocks will be rather small—perhaps 72 bits—it will be many radio interface radio Layer 2 blocks. FIG. 8 illustrates the S1 interface message leading to numerous radio interface Layer 2 blocks.

Even if many radio interface Layer 2 blocks are needed, it is unlikely to use segmented S1-Application Part (AP) messages. If the S1-AP data transfer procedures are to keep in line with present day UMTS and/or GSM/GPRS (Iu and/or A/Gb procedure respectively) the S1-AP and S1 direct transfer message will be kept to 256 bytes. This is due to legacy constraint of the size of the SCCP Connection Request message.

What this method discloses is allowing the MME to dynamically resize the number of TAs that is to be provided in the Multi-TA list and the White list to the physical limit of the S1-AP direct transfer message size without segmentation of S1 messages.

Thus, the MME is in total control of and is able to adjust between the number of TAs in Multi-TA lists and number of TAs in White-TA lists based on the decision or criteria with which the MME is programmed.

In this method, the number of TAs in the Multi-TA list and in the White-TA list is dynamic and in total—after catering for what else is necessary to be carried—fills up to the full size of a single S1-AP or S1 Direct Transfer message without segmentation over the S1-interface.

If the total number of TAs plus the other information is less than the size of a single S1-AP message or S1 Direct Transfer message then unused and unnecessary space of the S1-AP message or S1 Direct Transfer message should not be populated with "filler" dummy TAs. This will serve to reduce number of over the radio interface Layer 2 blocks.

A tail end indication is introduced to indicate the reaching of end of provided TAs. This obviated the need for a Length indicator for Multi-TA and a length indicator of White-TA. This tail end indicator is, for instance, a TA with an identity that cannot be interpreted as a valid TA identity, eg. H'FFFE (Hexadecimal FFFE). Alternatively two tail end indications each for each of the TA lists can be used.

The division between Multi-TA and White-TA, ie. where Multi-TA ends and where White-TA list begins (or vice-versa) are by way of an Information Element Identifier (IEI) of a next TA list with a preceding end of IE identification eg. H'FFFE (Hexadecimal coding of FFFE)

Figure 9:
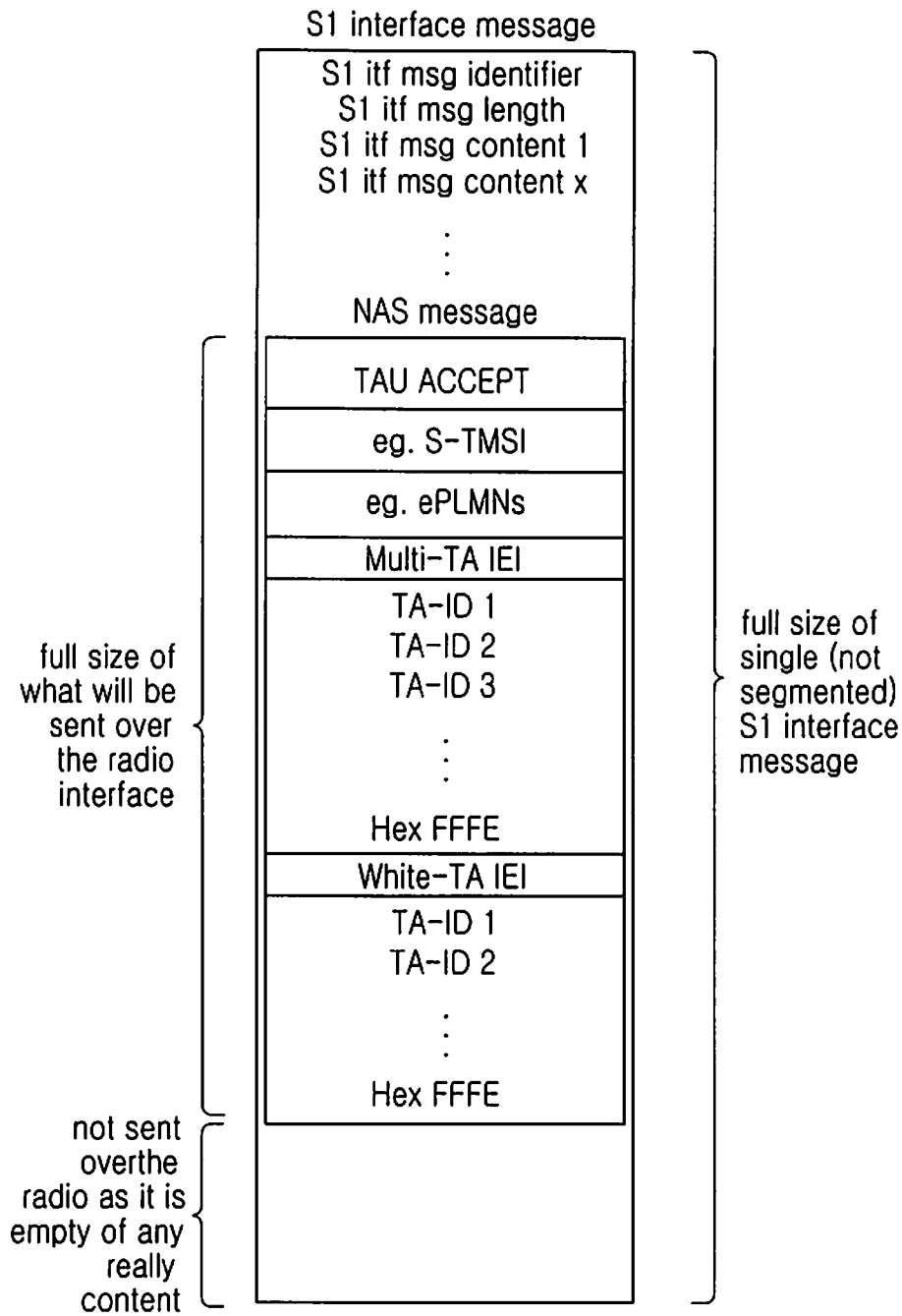
FIG. 9 illustrates an S1 interface message sent according to the present invention, the message including a plurality of TA lists and additional data.

FIG. 9 illustrates the expressed method, in particular showing the contents of an S1 message generated and sent by a network according to the present invention (e.g. from a MME to an eNB) The figure shows the portion that is then transmitted over the radio interface, and the end portion which is not.

It will be appreciated from the above that the methods of using a seed to "grow" the relevant TA list in certain embodiments of the invention is highly flexible, yet uses very little signalling payload (in form of occupying bytes in the signalling messages).

It will also be appreciated from the above that the methods of using an entirely fully variable TA size within signalling message goes beyond limiting the maximum size of the Information Element but rather limiting the size to maximum size of the entire signalling message.

It will also be appreciated that embodiments of the present invention may be used in a variety of applications, such as providing information of complete TAs to the UE terminal by the network, and deriving complete TAs by the UE as intended by the network.

The present invention discloses methods whereby the Network can provide related explicit or implicit information that allows the UE terminal to derive the intended complete and full TA lists.

The present invention discloses methods whereby the UE terminal having received related explicit or implicit information can derive the intended complete and full TA lists that the network wishes the UE terminal to have.

The present invention discloses methods whereby the Network can provide related explicit or implicit information that allows the UE terminal to derive the explicit intended information. Examples of such information provided in this specification include intended TA lists, but it will be appreciated that in principal the methods can be applied to any type of information that the network requires the UE terminal to receive.

The present invention discloses methods whereby the UE terminal having received related explicit or implicit information can derive the intended extended and complete amount of information that the network wishes the UE to have. Again, examples of such information given in this specification have included intended TA lists, but in principal the methods can be applied to any type of information the UE terminal needs from the network.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics described in conjunction with a particular aspect, embodiment or example of the invention are to be understood to be applicable to any other aspect, embodiment or example described herein unless incompatible therewith.

What is claimed is:

1. A method of operating a communications network and mobile user equipment (UE) in the network, the UE interacting with the network in accordance with interaction information, the method comprising the steps of:
   providing, when the UE is offline from the network at a time of initial provisioning, the UE with an algorithm usable with one or more input parameters;
   transmitting at least one input parameter for the algorithm from the network to the UE, wherein the at least one input parameter comprises at least one of a Tracking Area (TA) group size in number of TA layers, a TA group shape, and a range of TA identifiers in a TA group, and wherein the TA group defines an area or portion of the network;
   determining a quantity of interaction information by comparing a particular location with a result derived from the algorithm and the at least one input parameter; and
   determining at least one aspect of interaction between the UE and the network using the derived quantity of interaction information.

2. The method in accordance with claim 1, wherein the quantity of interaction information comprises an indication of whether the particular location is within the TA group.

3. The method in accordance with claim 2, wherein the particular location is a location in which the UE is currently located.

4. The method in accordance with claim 3, wherein determining at least one aspect of interaction comprises sending a message from the UE to the network when the UE is not within the area or portion of the network of the TA group.

5. The method in accordance with claim 4, wherein the area or portion of the network is an area or portion in which the UE is registered as located, and the sending a message from the UE further comprises sending a message to update the registered location of the UE with the network.

6. The method in accordance with claim 1, wherein the quantity of interaction information comprises a list of TA codes in the TA group.

7. The method in accordance with claim 6, wherein the quantity of interaction information further comprises an indication of whether a particular TA is within the TA group.

8. The method in accordance with claim 7, wherein the particular TA is a TA in which the UE is currently located.

9. The method in accordance with claim 1, wherein the quantity of interaction information comprises a list of the TA identity codes in the range of TA identifiers.

10. The method in accordance with claim 1, wherein the quantity of interaction information comprises an indication of whether a particular TA identity code is within the range of TA identifiers.

11. The method in accordance with claim 10, wherein the particular TA identity code is an identity code of a TA in which the UE is currently located.

12. The method in accordance with claim 1, wherein the transmitted at least one input parameter comprises the range of TA identifiers, and the range of TA identifiers comprises a range of Internet Protocol (IP) addresses, each IP address corresponding to a respective eNB of the network.

13. The method in accordance with claim 12, wherein the quantity of interaction information comprises a list of IP addresses in the range of IP addresses.

14. The method in accordance with claim 12, wherein the quantity of interaction information comprises an indication of whether a particular IP address is within the range of IP addresses.

15. The method in accordance with claim 14, wherein the particular IP address is an IP address of an E-Universal Terrestrial Radio Access Network (E-UTRAN) Node B (eNB) with which the UE is currently interacting.

16. A method for receiving information on Tracking Areas (TAs) by a User Equipment (UE) in a cellular network, the method comprising:
   transmitting, to a Mobility Management Entity (MME), an ATTACH REQUEST message;
   receiving, from the MME, an ATTACH ACCEPT message including a first Tracking Area Identify (TAI) list that identifies TAs that the UE can enter;
   storing the first TAI list included in the ATTACH ACCEPT message; and
   receiving, from the MME, a second TAI list identifying a further plurality of TAs and a plurality of closed subscriber groups in which the UE is allowed to access the network;
   wherein a size of the first TAI list is different according to a number of TAIs included in the first TAI list, and
   wherein receiving the second TAI list includes receiving the second TAI list in a same message as the first TAI list, and a plurality of data packets include the second TAI list and the first TAI list.

17. The method in accordance with claim 16, wherein the ATTACH ACCEPT message is a signaling interface (S1)-Application Part (AP) signal or an S1 Direct transfer message as an S1 interface message.

18. The method in accordance with claim 16, wherein the ATTACH ACCEPT message includes additional data.

19. The method in accordance with claim 18, wherein the size of the first TAI list is adjusted to fit inside the ATTACH ACCEPT message with the additional data.

20. The method in accordance with claim 16, further comprising adjusting a size of at least one of the first and second TAI lists such that both the first and second TAI lists fit inside the ATTACH ACCEPT message.

21. The method in accordance with claim 20, wherein the ATTACH ACCEPT message comprises additional data and the step of adjusting includes adjusting a size of at least one of the first and second TAI lists such that both the first and second TAI lists fit inside the ATTACH ACCEPT message together with the additional data.

22. The method in accordance with claim 20, further comprising adjusting the sizes of the first and second TAI lists, respectively.

23. The method in accordance with claim 16, wherein the ATTACH ACCEPT message has a maximum length, and the method further comprises truncating the ATTACH ACCEPT message if the first TAI list, together with the second TAI list and any additional data occupies less than the maximum length.

24. The method in accordance with claim 23, wherein the step of truncating comprises terminating the ATTACH ACCEPT message with an end indicator.

25. The method in accordance with claim 16, further comprising determining whether a particular TA is a TA identified in the first TAI list.

26. The method in accordance with claim 25, wherein determining whether a particular TA is a TA identified in the first TA list comprises:
  determining whether a current TA in which the UE is currently located is identified in the first TAI list, and if the current TA is not identified in the first TAI list, transmitting a message indicating that the current TA is not identified in the first TAI list to the MME.

27. A User Equipment (UE) in a cellular network, the UE comprising:
  a transmitter for transmitting, to a Mobility Management Entity (MME), an ATTACH REQUEST message;
  a receiver for receiving, from the MME, an ATTACH ACCEPT message including a first Tracking Area Identify (TAI) list that identifies Tracking Areas (TAs) that the UE can enter, and receiving, from the MME, a second TAI list identifying a further plurality of TAs and a plurality of closed subscriber groups in which the UE is allowed to access the network; and
  a memory for storing the first TAI list included in the ATTACH ACCEPT message,
  wherein a size of the first TAI list is different according to a number of TAIs included in the first TAI list, and
  wherein the receiver receives the second TAI list in a same message as the first TAI list, and a plurality of data packets include the second TAI list and the first TAI list.

28. A method for transmitting information on Tracking Areas (TAs) by a Mobility Management Entity (MME) in a cellular network, the method comprising:
  receiving, from a User Equipment (UE), an ATTACH REQUEST message;
  determining whether an ATTACH REQUEST of the UE is accepted; and
  if the ATTACH REQUEST of the UE is accepted, transmitting, to the UE, an ATTACH ACCEPT message including a first Tracking Area Identify (TAI) list that identifies TAs that the UE can enter, and transmitting, to the UE, a second TAI list identifying a further plurality of TAs and a plurality of closed subscriber groups in which the UE is allowed to access the network,
  wherein a size of the first TAI list is different according to a number of TAIs included in the first TAI list, and
  wherein transmitting the second TAI list includes transmitting the second TAI list in a same message as the first TAI list, and a plurality of data packets include the second TAI list and the first TAI list.

29. A Mobility Management Entity (MME) for transmitting information on Tracking Areas (TAs) in a cellular network, the MME comprising:
  a transmitter;
  a receiver for receiving, from a User Equipment (UE), an ATTACH REQUEST message; and
  a controller for determining whether an ATTACH REQUEST of the UE is accepted, and if the ATTACH REQUEST of the UE is accepted, by controlling the transmitter, transmitting, to the UE, an ATTACH ACCEPT message including a first Tracking Area Identify (TAI) list that identifies TAs that the UE can enter, and transmitting, to the UE, a second TAI list identifying a further plurality of TAs and a plurality of closed subscriber groups in which the UE is allowed to access the network,
  wherein a size of the first TAI list is different according to a number of TAIs included in the first TAI list, and
  wherein the transmitter transits the second TAI list in a same message as the first TAI list, and a plurality of data packets include the second TAI list and the first TAI list.

* * * * *